C. M. WILCOX.
FISH LURE.
APPLICATION FILED JULY 1, 1908.
923,095.
Patented May 25, 1909.
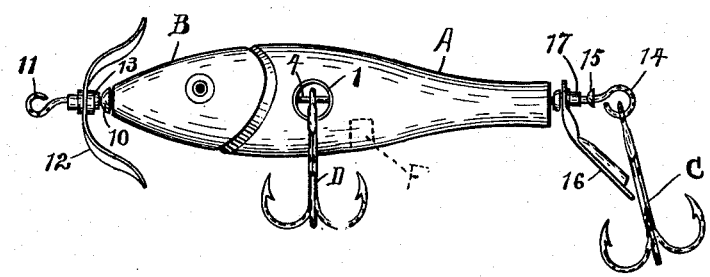
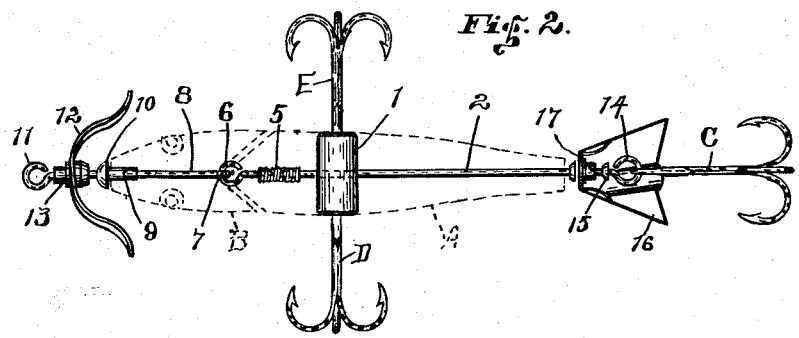
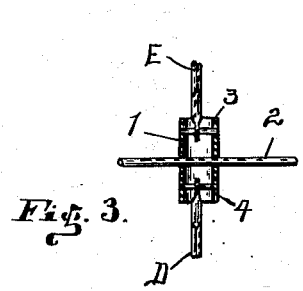
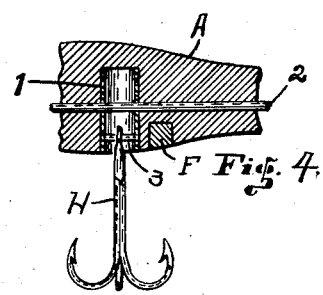
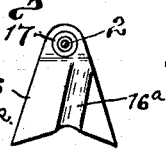
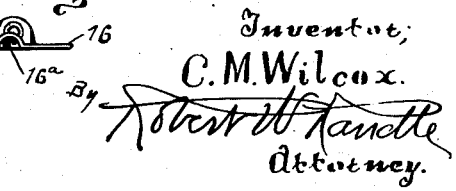

UNITED STATES PATENT OFFICE.

CHARLES M. WILCOX, OF NEW PARIS, OHIO, ASSIGNOR, BY DIRECT AND MESNE ASSIGNMENTS, TO THE WIGGLER MANUFACTURING COMPANY, OF ELWOOD, INDIANA, A CORPORATION OF INDIANA.

FISH-LURE.

No. 923,095.  Specification of Letters Patent.  Patented May 25, 1909.

Application filed July 1, 1908. Serial No. 441,285.

*To all whom it may concern:*

Be it known that I, CHARLES M. WILCOX, a citizen of the United States, residing in New Paris, in the county of Preble and State of Ohio, have invented certain new and useful Improvements in Fish-Lures, of which the following is a full and accurate specification, from which my invention could be constructed with absolute exactitude.

My present invention contemplates a two-part lure or artificial fish bait, comprising a body portion, and a head portion pivoted to the body, the two parts being adapted to have horizontal motions with relation to each other, whereby the device may have a wiggling motion when being trolled through water.

The invention also contemplates a two-blade spinner revolubly mounted in front of the head; a single blade spinner revolubly mounted to the rear of the body; means whereby a lead line may be attached in advance of the forward spinner; and a plurality of hooks pivotedly depending from the device.

The predominant object of my present invention is to form a fish lure adapted to describe a zig-zag course when being trolled in water and by which the lure is caused to wiggle or simulate the actual movements of a live fish.

The specific objects I have in view for the better accomplishment of the main object is,—the improved skeletonization or framework; the means for detachably connecting the groups of hooks to the body whereby that may not be inadvertently removed; and the particular construction of the single blade spinner.

All of the above named features are clearly shown in the accompanying drawings, in which—

Figure 1 is a side elevation of my invention complete. Fig. 2 is a plan view of the skeletonization, showing the parts connected in operative position, and also showing a diagrammatical outline of the wooden or body portions of the lure. Fig. 3 is a detail horizontal central section of the central portion of the frame, showing the manner of securing the side hooks in position. Fig. 4 is a detail vertical central section of a slightly modified form, showing the manner of connecting a group of hooks to the underside of the body. Fig. 5 is a face view of the single-blade spinner, and Fig. 6 is an end view of the same.

Similar indices denote like parts throughout the several views of the drawings.

Referring now to the drawings in concrete detail: Letter A denotes the body, and B denotes the head, these two parts being formed, preferably, of wood or other buoyant material and are formed to simulate a live fish, which simulation may be further emphasized by suitable color painting on the exterior of said parts though not indicated in the drawings.

The front end of the body A is formed wedge-shaped, and the rear end of the head B is formed as a vertical notch whose angular inclination is greater than is the angular inclination of the wedge portion of the body A, by which when the point of the wedge is positioned in the vortex of the notch the differences in the angular inclination of the notch and the wedge will allow the head to be moved sidewise a limited distance.

Extending centrally and longitudinally through the body and the head is a small round aperture for portions of the frame to extend through, hereinafter referred to.

Disposed across through the thickest portion of the body A is a comparatively large round aperture, located at right angles to and intersecting the first named aperture. The said second aperture is adapted to loosely receive therein the thimble 1. Said thimble is formed of a plain section of metal tube and is of a length such as to extend across through the body A with its ends flush with each side thereof. Said thimble is provided with a central cross-aperture, and near each end are formed other cross-apertures, all three cross-apertures being parallel with each other and intersecting the interior of the thimble, substantially as indicated in Fig. 3. The said central cross-aperture of the thimble is adapted to loosely receive therethrough the rod 2, and the other two cross apertures are adapted to loosely receive the pins 3 and 4 as shown in Fig. 3.

The numeral 5 denotes a coupling which is threaded both interiorly and exteriorly. The forward end of the longitudinal aperture of the body A being slightly enlarged to allow said coupling to be screwed therein where it will be permanently located between the aperture for the thimble 1 and the forward end of the body A.

The numeral 6 denotes an eye having a threaded stem to be screwed into the forward end of the coupling 5. Said eye 6 is located at the apex of the wedge of the body A.

Numeral 7 denotes an eye similar to the eye 6 with which it is interlocked, as in Fig. 2, to form the hinge between the body and the head. Formed integral with the eye 7 is the forwardly extending stem 8 which extends through the head B.

Numeral 9 denotes a coupling having an outer half-rounded knob 10 formed integral therewith. The rear portion of the coupling 9 is fitted into the central aperture formed through the head B, the forward end of the last named aperture being enlarged to receive said coupling. The rear face of said knob 10 forms a square shoulder for the forward end of the head B, while the forward face of said knob is rounded to conform to the contour of the head, forming the nose therefor as indicated.

Numeral 11 denotes an eye having rearwardly extending stem whose free end is threaded into the coupling 9 (or the knob 10).

Numeral 12 denotes a two-blade spinner having a central hub 13 which is revolubly mounted around the stem of the eye 11 and extending from said eye 11 to near the knob 10. The eye 11 is for the purpose of having a troll line secured therein.

Formed on the rear end of the rod 2 is an eye 14.

Numeral 15 denotes a free-washer mounted on the rod 2 and adapted to contact with the eye 14.

Numeral 16 denotes the single blade spinner which is secured to its hub 17. Said hub is revolubly mounted around the rod 2 and is located between the washer 15 and the rear end of the body A, as in Fig. 1. Said spinner 16 is of novel construction, being deltoidnal in contour or, more properly speaking, being the shape of a fish-tail, but inclined outward at an angle as shown. In the forward face of the spinner 16 is formed a comparatively large half-round sloping channel pressed into the material of which the spinner is formed. Said channel projects from the rear center of the spinner forward and to one side out of alinement with the hub 17 and decreases in depth forward. By reason of this channel and its position the pressure of the water upon the forward face of the spinner will be greater on one side than on the other, thereby eventuating in causing the spinner to revolve when being trolled.

The letter F denotes a weight, as of lead, located in the central portion of the underside of the body, to cause the device to maintain proper position in the water.

Letter C denotes a group of hooks suspended from the eye 14; and the letters D and E denote each a group of hooks suspended from the sides of the body. The shanks of each of said group of hooks D and E terminate in an eye to receive therethrough the respective pins 4 and 3. The distance of the pins 3 and 4 from the ends of the thimble 1 is such as to cause the two groups of hooks E and D to slant out somewhat at an angle as desired.

From the above it will be readily seen that the hooks D and E can not become inadvertently detached from the body, when the several parts are assembled as shown, but that if it is desired to change said hooks they may be readily removed and replaced as follows: Turn the eye 14, causing the rod 2 to unscrew out of the coupling 5, and then draw the rod 2 back out of the thimble 1, now the thimble may be moved endwise in either direction sufficiently to allow the pin 3, or pin 4, to be moved endwise to relase the hooks suspended therefrom; after the above the thimble is moved back to its normal position and the rod 2 is again projected therethrough which of course will prevent the thimble from being moved endwise, thereby preventing said pins from being removed to free the hooks D and E.

By reference to Fig. 4 it will be noticed that, if desired, the cross-aperture for the thimble 1 may be dispensed with, and in place thereof an aperture may be formed extending upward from the underside of the body A, with a thimble inserted therein as shown which thimble has a central cross aperture, same as thimble 1, for the rod 2 to pass through to lock it in position, and it also has a cross aperture near its lower end for the pin 3, on which latter may be suspended the hooks H. The operation of removing and replacing the hooks H is substantially the same as that above stated with reference to the hooks D and E, except that but one group of hooks is employed in this instance which, when in position, hang down underneath the center of the body.

I desire that it be understood that various changes may be made in the details of construction, herein shown and described, without departing from the spirit of my invention or sacrificing any of the advantages thereof.

Having now fully shown and described my invention, what I claim and desire to secure by Letters Patent of the United States, is—

1. A fish lure comprising a buoyant body, a head pivoted to the body for lateral movements with relation thereto, a single-blade spinner pivoted in rear of the body, said spinner being disposed at an angle and simulating a fish-tail and having a channel formed in its forward face, said channel being disposed at an angle extending to one side from the center of the rear end of the spinner.

2. A fish lure comprising a buoyant body, a head pivoted to the body and adapted to have lateral movements with relation thereto, a metal frame extending longitudinally through the body, a thimble extending across through the body with one member of said frame removably extending therethrough, a pin extending through each end of the thimble and locked in position when the thimble is secured in position by said member, and a group of hooks depending from each of said pins.

3. A fish lure comprising a buoyant body and a head independent of each other, a frame on which the head and body are mounted, a double-blade spinner mounted on the frame in advance of the head, a single-blade spinner mounted on the frame in rear of the body, a thimble removably secured in the body and extending flush therewith, a pin extending across through the outer portion of said thimble and removable only when the frame is disconnected from the thimble and the thimble has been moved endwise, and a group of hooks pivoted on said pin, all substantially as set forth.

4. A fish lure comprising a body, a rod disposed longitudinally in the center of the body, a thimble extending across through the body at right angles to said rod, said rod extending therethrough, a pin extending across through each end portion of the thimble and parallel to said rod, the rod being adapted to hold the thimble in position and preventing the removal of said pins when the parts are assembled, and hooks pivoted to said pins and removable therefrom only when said pins are released.

5. A fish lure having a thimble movable therein and extending thereacross, pins disposed across through the thimble, a rod removably disposed longitudinally through the lure and adapted to extend through the thimble to hold the thimble in position, and a group of hooks depending from each of said pins, said hooks being removable only when said rod is removed from said thimble and when the thimble has been moved endwise to allow the removal of said pins.

6. A fish lure having a spinner with a channel disposed at an angle in the face thereof, the angle at which said channel is disposed causing the said spinner to revolve when the lure is drawn through water, all substantially as set forth.

7. A fish lure comprising a body, a thimble located in the body, the axial direction of the thimble being at right angles to the body, a rod extending longitudinally of the body and located centrally thereof and adapted to pass through said thimble and at right angles thereto and adapted to retain the thimble in operative position, a pin extending across through the thimble and adapted to be removed only when the thimble is moved out of operative position, and hooks depending from said pin, all substantially as shown and described.

Signed at Richmond, county of Wayne, State of Indiana, this 26th day of June, 1908, in the presence of two subscribing witnesses.

CHARLES M. WILCOX.

Witnesses:
R. W. RANDLE,
R. E. RANDLE.